United States Patent [19]

Kirstein

[11] Patent Number: 4,554,451
[45] Date of Patent: Nov. 19, 1985

[54] OPTOELECTRONIC POSITION INDICATOR FOR A DRIVE SYSTEM

[75] Inventor: Gerhard Kirstein, Augsburg, Fed. Rep. of Germany

[73] Assignee: Zahnraderfabrik Renk A.G., Augsburg, Fed. Rep. of Germany

[21] Appl. No.: 497,820

[22] Filed: May 25, 1983

[30] Foreign Application Priority Data

Jun. 8, 1982 [DE] Fed. Rep. of Germany ....... 3221621

[51] Int. Cl.⁴ ................................................. H01J 3/14
[52] U.S. Cl. ............................ 250/237 G; 250/211 K
[58] Field of Search ........ 250/231 SE, 237 G, 211 K; 356/395; 340/347 P

[56] References Cited

U.S. PATENT DOCUMENTS

| 3,708,681 | 1/1973 | Ivers | 250/237 G |
| 4,152,579 | 5/1979 | Feinland | 250/237 G |
| 4,284,885 | 8/1981 | Swensen | 250/211 K |
| 4,314,153 | 2/1982 | Humphries et al. | 250/231 SE |
| 4,320,293 | 3/1982 | Guretzky | 250/231 SE |
| 4,442,351 | 4/1984 | Pfeifer et al. | 250/237 G |

Primary Examiner—David C. Nelms
Attorney, Agent, or Firm—Natter & Natter

[57] ABSTRACT

An optoelectronic system is employed for determining the position of a movable vehicle control element such as a gas pedal. The system includes an optical carrier which is linked to and moves with the control element. The carrier includes an optical indicator range which provides a continuously variable gradient of optical permeability over the limits of carrier movement. A light source and an electro-optical detector are arranged to generate an electrical signal indicative of a measure of optical permeability of a zone of the range in registry with the detector. The light source and detector may be positioned on the same or opposite sides of the carrier. A further range of the same or different configuration may be formed on the carrier and associated with a second light source-detector. The signals generated by each detector are processed to generate a signal indicative of the position of the control element. Optionally, a signal generated by a single detector comprises the position indicative signal.

9 Claims, 4 Drawing Figures

OPTOELECTRONIC POSITION INDICATOR FOR A DRIVE SYSTEM

TECHNICAL FIELD

The invention relates generally to controls for drive systems and more particularly to an optoelectronic system for determining the operator set position of a movable drive system element.

BACKGROUND ART

The present invention deals with position indicator systems for operator setable control elements such as those employed in power drive systems, e.g. vehicle drive systems. In such environments, the position of operator setable control elements provided drive system control functions, for example, control over fuel adjusting elements and coupling devices.

Among generally known position indicators were contact type on/off switches, (e.g. Micro-switches), potentiometers and Hall generators. One of the disadvantages of contact type on/off switches when employed as position indicators was that they could not generate a continuously variable signal because they switched only upon sensing certain positions of monitored movement. Further, contact type switches were susceptible to mechanical wear and therefore, reliability after extended operation suffered.

The employment of potentiometers as position indicators did permit the generation of a continuously variable signal for measurement of the position of a monitored element but, they too had limited useful life due to friction and wear between components.

DISCLOSURE OF THE INVENTION

The present invention provides an optoelectronic system for monitoring the position of drive system control elements and includes an optical carrier mechanically connected to the control element so that it moves as a function of movement of the control element.

An optical indicator range is associated with the carrier and the range includes a continuously variable optical permeability gradient between two points spaced from each other along a plane of carrier motion. The points are spaced a distance greater than the limits of carrier movement.

A light source and an associated optical detector are fixed relative to the carrier and generate an electrical signal indicative of a measure of the instantaneous optical permeability of a zone of the range in registry with the light source-detector. A second optical range may also be provided on the carrier and the apparatus includes a second light source-detector for reading a registered zone of the second range. The second range may bear additional information in the form of readable characters.

If the light source and detector are on opposite sides of the carrier, the detector output signal comprises an instantaneous measure of light transmission through the range. When the light source and detector are on the same side of the carrier, the signal comprises an instantaneous measure of light reflection.

The signals generated by each light source-detector set are processed for generating a position indicative composite signal. Alternately, a signal generated from a single light source-detector set is utilizable as the position indicative signal.

The position indicative signal is employed to control the drive system function associated with the monitored control element. Additionally, such signal may be employed for general drive system monitoring purposes as well as for generating indicia in an optical display.

From the foregoing compendium, it will be appreciated that it is an aspect of the present invention to provide an optoelectronic position indicator system of the general character described, for a drive system control element which indicator system is not subject to the disadvantages of the prior art aforementioned.

It is a further aspect of the present invention to provide an optoelectronic position indicator system of the general character described for a drive system control element which permits infinitely variable measurement of the position of the control element over the limits of its path of travel without being subject to frictional wear.

A further feature of the present invention is to provide an optoelectronic position indicator system of the general character described for drive systems which is free of contact between stationery and moving parts to thereby provide extended operating life with high reliability.

It is a further attribute of the present invention to provide an optoelectronic position indicator system of the general character described for a drive system control element which is low in cost and well suited for economical mass production fabrication.

A further feature of the present invention is to provide an optoelectronic position indicator system of the general character described for a drive system which provides a position indicative signal employable for a multiplicity of drive system functions such as the adjustment of components of the drive system, the initiation of coupling operations, switching and braking operations and for generating a visual indication of position.

Other features, advantages and aspects of the present invention in part will be obvious and in part will be pointed our hereinafter.

With these ends inview, the invention finds embodiment in the various combinations of elements and arrangements of parts by which the features, aspects and attributes aforementioned and certain other features and aspects are hereinafter attained, all as more fully described with reference to the accompanying drawings and the scope of which is more particularly pointed out and indicated in the appended claims.

BRIEF DESCRIPTION OF THE DRAWINGS

In the accompanying drawings, wherein are shown some of the various possible exemplary embodiments of the invention.

BEST MODE FOR CARRYING OUT THE INVENTION

Figure 1:
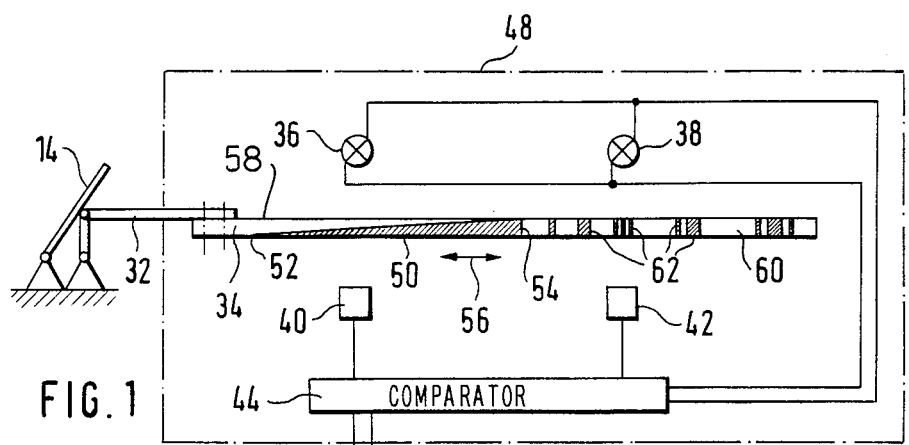
FIG. 1 is a schematized block diagram of a typical vehicle drive system and showing an optoelectronic position indicator system constructed in accordance with the present invention interconnecting an operator setable control element and the remainder of the drive system.
Figure 2:
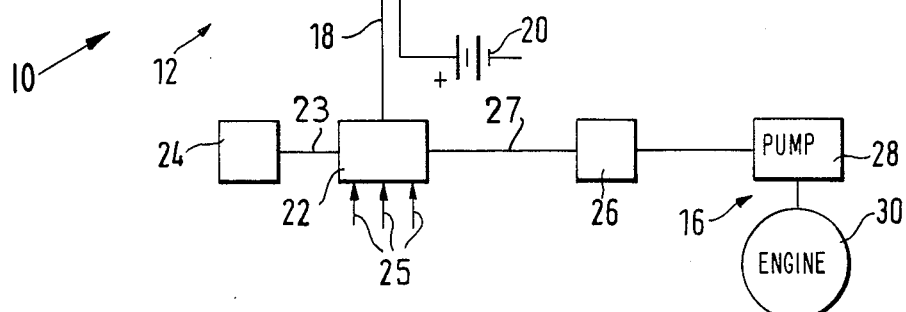
FIG. 2 is a top plan view of an optical carrier of the optoelectronic position indicator system showing a first and a second optical range formed on the carrier with the first range having a continuously variable gradient of optical permeability.

Referring now in detail to the drawings, reference numeral 10 denotes generally a drive system suitable for the propulsion of a vehicle. In typical applications, such drive system might provide driving power for land, sea or air craft, however, the present invention should not be construed as limited to such applications and may well be suited for implementation as a stationery drive system powered by controllable engines or motors for powering generating stations, compressors, pumps and the like.

The drive system 10 includes an optoelectronic position indicator system 12 constructed in accordance with the present invention and which interconnects an operator setable control element 14 such as a gas pedal with control mechanisms for adjusting components of the drive system 10.

It should be appreciated that while a gas pedal control element 14 is shown in the drawing, other operator setable drive system control elements such as brake controls, clutch controls, shift linkages etc. may be position monitored in accordance with the teachings of the instant invention. The position indicator system 12 is adapted to generate a position indicative signal along an output line 18. Such signal represents a variable measure of the instantaneous position of the control element 14.

The control element 14 is mechanically connected to an optical carrier 34 through a suitable interface linkage 32 as illustrated schematically in FIG. 1 Movement of the control element 14 by an operator thus results in corresponding movement of the carrier 34 along a plane indicated by the arrow 56.

The carrier 34 comprises an elongate generally planar light transmissible slab 58, preferably formed of a suitable transparent plastic such as an acrylic and having its longitudinal axis coincident with the direction of motion.

A substantially airtight and dustproof casing 48, illustrated in dot and dash lines in FIG. 1, houses the carrier 34 and other components of the position indicator system 12. It should be appreciated that the interface linkage 32 extends through the casing 48 without degrading the integrity of such casing. The casing 48 may provide a shield for blocking undesirable illumination for reasons which will become readily apparent.

The optical carrier 34 is arranged for translational movement along the longitudinal axis of the slab 58 as previously described. The direction of movement extends transversely to an illumination path between a first light source 36 and an associated detector 40 as well as a second light source 38 and its associated detector 42. The light sources 36, 38 may comprise an electroluminescent emitter such as, for example, a light emitting diode and the detectors 40, 42 may comprise any device having utilizable photoconductivity properties.

The outputs of each of the detectors 40, 42 are received at a circuit 44 for processing and generating a position indicative signal. The processing circuit 44, the light sources 36, 38 and the detectors 40, 42 are powered through a suitable voltage source such as a battery 20.

The position indicative signal is transmitted along an output line 18 and received at a microprocessor 22. The microprocessor 22 transmits a processed output signal indicative of the position of the control element 14 along a line 23 which extends to an optical display 24.

Additional input lines 25 lead to the microprocessor from remote drive system and/or vehicle sensors. Such lines 25 transmit monitoring information relative to the vehicle such as engine speed, gear speed, vehicle speed, system temperatures, fluid pressures, etc.

The microprocessor 22 generates control signal for a drive system function in response to the position indicative signal received along the line 18. If the control element 14 comprises a gas pedal, a microprocessor output line 27 carries a control signal to a control unit 26. The control unit 26 effects control over a fuel injection pump 28 associated with an engine 30 of a power subsystem 16.

Having generally described the drive system, attention is now directed to the optoelectronic position indicator system 12 contained within the casing 48. As previously mentioned, the light sources 36, 38 comprise an electroluminescent emitter. Such emitters provide constant luminous intensity. With respect to the detectors 40, 42, such detectors generate a signal as a function of the luminous intensity received upon their detecting surfaces and may comprise photocells, photodiodes, phototransistors, selenium cells, solar cells, infrared receiver cells and similar devices.

The optical carrier 34 includes a first optical indicator range 50 which extends lengthwise along the carrier between an initial point 52 and a terminal point 54. The range 50 is constructed to provide a continuously variable gradient of optical permeability or light responsiveness such that maximum light transmission through the optical path of the light source-detector 36, 40 will be obtained when the carrier is so positioned that the optical path is registered with a zone of the indicator range 50 encompassing the initial point 52 and minimum light transmission will occur when the optical path is registered with a zone of the indicator range 50 encompassing the terminal point 54. At intermediate positions, the detector 40 will generate a signal representative of luminous intensity of the light passing through the range 50 in a zone registered with the optical path.

Preferably between the initial and terminal points 52, 54 optical permeability of the indicator range varies linearly and the indicator range 50 can be considered an optical wedge. It should be understood, however, that other algorithmic functions may be employed for generating a gradient of continuously variable optical permeability.

The optical carrier 34 also includes an optical information range 60 which extends lengthwise along the axis of the slab 58, separate and apart from the position indicator range 50. The information range 60 is constructed to provide additional information indicative of the position of the carrier 34, hence the control element 14. Such information may be recorded in the range 60 as optically readable characters 62, the size, position and spacing of which are in accordance with a predesignated, arrangement for conveying instantaneous positional information such as a bar code.

The optical carrier 34 is positioned within the casing 48 such that within its limits of movement the additional information range 60 will be positioned within an optical path extending between the light source 38 and the detector 42. The detector 42 reads such information.

A signal line extends between each of the detectors 40, 42 to the processing circuit 44. The processing circuit 44 may comprise a comparator which compares the signals from each detector and generates a resultant signal which comprises an exact instantaneous measure of the position of the control element 14. In operation, the comparator examines the signal levels received from each detector; if the signals deviate from each other more than a specific value, a particular signal is registered at the microprocessor 22 as an error signal. A position indicative signal transmitted along the line 18 to the microprocessor 22 may comprise one of the signals of the detectors 40, 42 or the addition or multiplication value of both signals, or the difference of the full value of one signal and a fraction of the value of the other signal or a signal having a corresponding value but being generated separately. Due to the implementation of two ranges 50, 60 and corresponding light source detectors for each range, a position indicative signal can be generated on the output line 18 even if one of the light source-detector signal generating circuits fails. It should also be understood that a single range and single light source detector set may be employed in which instance the processing circuit 44 is not necessary.

The optical indicator range 50 may be constructed by impregnating the optical carrier 34 with paint, dye, pigmentation or other light blocking material of varying color or intensity concentrations between the limits of the points 52, 54. With respect to the additional information range 62, the optically readable characters are formed by impregnating the same medium into the slab with uniform density.

Figure 3:
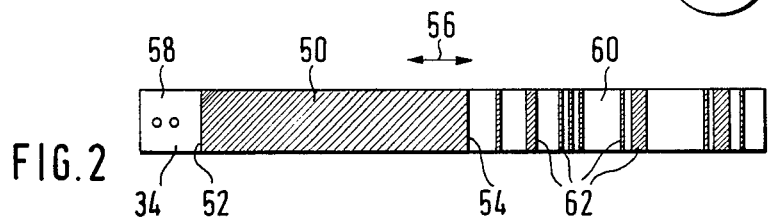
FIG. 3 comprises a front elevational view of an alternate embodiment of the carrier wherein the optical ranges are formed by overlaying material on the upper surface of the carrier.

In FIG. 3 an alternate embodiment of the optical carrier is illustrated. In this embodiment, an optical carrier 340 includes two optical ranges 550 and 660. Each of the ranges is formed by adhering paint, dye or other material to the carrier 340. To form the optical indicator range 550, the paint, dye, pigmentation or other material is arranged with a continuously varying concentration to provide a continuously linearly variable optical permeability across the length of the range.

Figure 4:
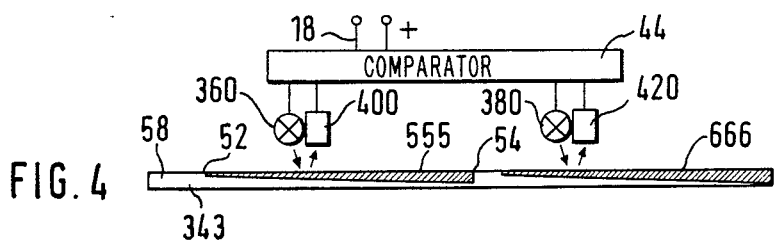
FIG. 4 comprises a front elevational view of a further embodiment of the optoelectronic position indicator system, with portions omitted for clarity, and showing an optical carrier with a pair of similar ranges both having continuously variable light reflective characteristics and with the system further including a light source and an optical detector for each range.

A still further embodiment of the invention is illustrated in FIG. 4. In this embodiment, an optical carrier 343 is formed with a pair of optical ranges 555 and 666. Each range provides continuously variable optical permeability and is formed by roughing the surface of the carrier 343 or providing it with burns of varying intensity. A light source 360 and a corresponding detector 400 are positioned on the same side of the optical carrier 343 such that throughout the limits of motion of the optical carrier 343, the detector 400 will be receiving light reflected from a zone of the optical indicator range 555 within an optical path between the light source 360 and the detector 400. Similarly, a second light source 380 and corresponding detector 420 are positioned to receive light reflected from the second additional information range 666.

The varying optical permeability in the position indicator range 555 and in the additional information range 666 provide different light reflecting properties in such ranges. For example, the position indicator range 555 maintains a minimal light reflecting capability at an initial point 52 and a maximum light reflecting capability at a terminal point 54 with continuously linearly increasing light reflecting capabilities between the points 52, 54. The additional information range 666 is similarly provided with a continuously varying optical permeability in a manner substantially as described with respect to the optical indicator range 555.

Thus, it will be seen that there is presented an optoelectronic position indicator system which provides the various features, aspects and attributes of the present invention and which is well suited to meet the conditions of practical usage.

As various changes might be made in the present invention as above set forth, it is to be understood that all matter herein described or shown in the accompanying drawings is to be interpreted as illustrative and not in a limiting sense.

Having thus described the invention, they are as claimed as new and desired to be secured by Letters Patent:

1. A position indicator system for monitoring an operator settable speed control element of a drive system, the drive system further including an engine, means for supplying fuel to the engine, and means operatively interconnecting the fuel supply means with the engine, the position indicator system including a light source, an electro-optical detector, the detector including means for generating an electrical signal as a function of the luminous intensity received from the light source along an optical path, an optical carrier, the optical carrier being positioned within the optical path, the optical carrier including means forming a position indicator range, the means forming a position indicator range including means providing a continuously variable light responsive gradient, the light responsive gradient having a minimum value at one end of the range and a maximum value at the other end of the range, the optical carrier including an additional information range, the additional information range including a continuously variable light responsive gradient, the position indicator system further including a second light source and a second electro-optical detector associated with the additional information range, the additional information range being positioned within an optical path from the second light source to the second detector and means interconnecting the speed control element and the carrier for providing translational movement of the carrier as a function of movement of the speed control element, the translational movement being in a direction coincident with the light responsive gradients, each detector generating a signal indicative of a measure of the light responsiveness of a zone of its respective range in registry with its optical path, the position indicator system further including a processing circuit, means operably interconnecting each of the detectors to the processing circuit, the processing circuit including a comparator, the comparator receiving signals from each of the detectors and generating an output signal corresponding to the position of the speed control element, the drive system further including a microprocessor and means operably interconnecting the comparator with the microprocessor, the microprocessor receiving the output signal from the comparator and in response thereto generating a signal for controlling the fuel supply means, whereby fuel supply to the engine is controlled in response to the detected instantaneous position of the speed control.

2. An optoelectronic position indicator system constructed in accordance with claim 1 wherein the optical carrier is positioned between the light source and the detector.

3. An optoelectronic position indicator system constructed in accordance with claim 1 wherein the optical carrier comprises a light transmitting slab and the position indicator range is adhered to the slab.

4. An optoelectronic position indicator system constructed in accordance with claim 1 wherein the optical carrier comprises an acrylic slab.

5. An optoelectronic position indicator system constructed in accordance with claim 1 wherein the continuously variable light responsive gradient of the position indicator range increases linearly from a minimum value at one end to a maximum value at the other end.

6. A position indicator system for monitoring an operator settable speed control element of a drive system, the drive system further including an engine, means for supplying fuel to the engine, and means operatively interconnecting the fuel supply means with the engine, the position indicator system including a light source, an electro-optical detector, the detector including means for generating an electrical signal as a function of the luminous intensity received from the light source along an optical path, an optical carrier, the optical carrier being positioned within the optical path, the optical carrier including means forming a position indicator range, the means forming a position indicator range including means providing a continuously variable light responsive gradient, the light responsive gradient having a minimum value at one end of the range and a maximum value at the other end of the range, the optical carrier including an additional information range, the additional information range including a continuously variable light responsive gradient, the position indicator system further including a second light source and a second electro-optical detector associated with the additional information range, the additional information range being positioned within an optical path from the second light source to the second detector and means interconnecting the speed control element and the carrier for providing translational movement of the carrier as a function of movement of the speed control element, the translational movement being in a direction coincident with the light responsive gradients, each detector generating a signal indicative of a measure of the light responsiveness of a zone of its respective range in registry with its optical path, at least one light source and at least one electro-optical detector being positioned on the same side of the optical carrier and the continuously variable light responsive gradient associated with the one light source and one electro-optical detector comprising a continuously increasing light reflecting gradient, the position indicator system further including a processing circuit, means operably interconnecting each of the detectors to the processing circuit, the processing circuit including a comparator, the comparator receiving signals from each of the detectors and generating an output signal corresponding to the position of the speed control element, the drive system further including a microprocessor and means operably interconnecting the comparator with the microprocessor, the microprocessor receiving the output signal from the comparator and in response thereto generating a signal for controlling the fuel supply means, whereby fuel supply to the engine is controlled in response to the detected instantaneous position of the speed control.

7. A position indicator system constructed in accordance with claim 6 wherein both light sources and electro-optical detectors are positioned on the same side of the optical carrier.

8. A position indicator system for monitoring an operator settable speed control element of a drive system, the drive system further including an engine, means for supplying fuel to the engine, and means operatively interconnecting the fuel supply means with the engine, the position indicator system including a light source, an electro-optical detector, the detector including means for generating an electrical signal as a function of the luminous intensity received from the light source along an optical path, an optical carrier, the optical carrier being positioned within the optical path, the optical carrier including means forming a position indicator range, the means forming a position indicator range including means providing a continuously variable light responsive gradient, the light responsive gradient having a minimum value at one end of the range and a maximum value at the other end of the range, the optical carrier including an additional information range, the additional information range including a series of discrete optically readable characters, the position indicator system further including a second light source and a second electro-optical detector associated with the additional information range, the additional information range being positioned within an optical path from the second light source to the second detector and means interconnecting the speed control element and the carrier for providing translational movement of the carrier as a function of movement of the speed control element, the translational movement being in a direction coincident with the light responsive gradients, each detector generating an instantaneous signal indicative of a measure of the light responsiveness of a zone of its respective range in registry in registry with its optical path, the position indicator system further including a processing circuit, means operably interconnecting each of the detectors to the processing circuit, the processing circuit including a comparator, the comparator receiving signals from each of the detectors and generating an output signal corresponding to the position of the speed control element, the drive system further including a microprocessor and means operably interconnecting the comparator with the microprocessor, the microprocessor receiving the output signal from the comparator and in response thereto generating a signal for controlling the fuel supply means, whereby fuel supply to the engine is controlled in response to the detected instantaneous position of the speed control.

9. A position indicator system constructed in accordance with claim 8 wherein the series of optically readable characters comprises a bar code.

* * * * *